Aug. 4, 1964  M. J. CELOVSKY  3,142,942
BRAKING DEVICE FOR INDEXING MACHINE
Filed June 9, 1960  3 Sheets-Sheet 1
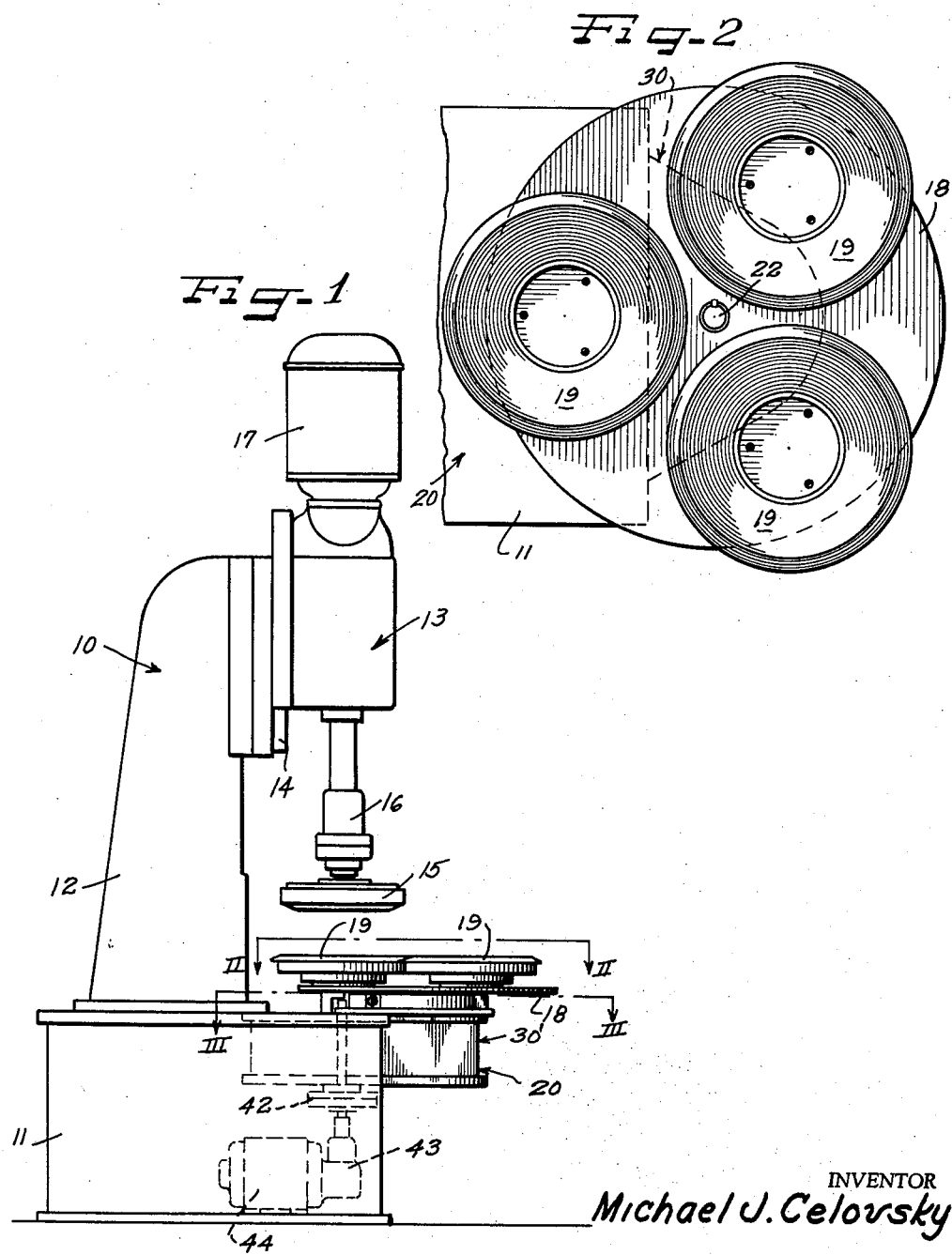
INVENTOR
Michael J. Celovsky
BY
ATTORNEYS

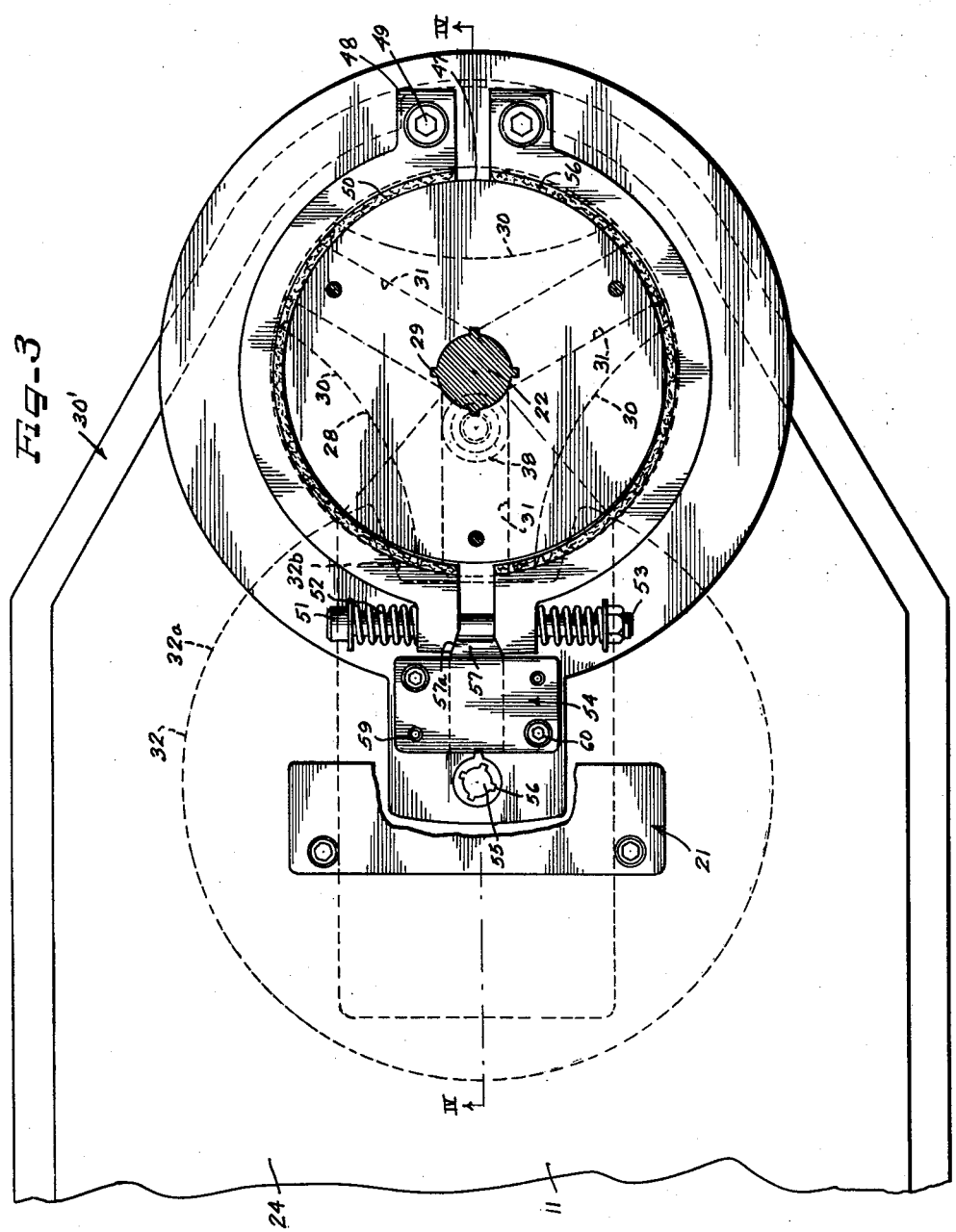

Aug. 4, 1964    M. J. CELOVSKY    3,142,942
BRAKING DEVICE FOR INDEXING MACHINE
Filed June 9, 1960    3 Sheets-Sheet 3
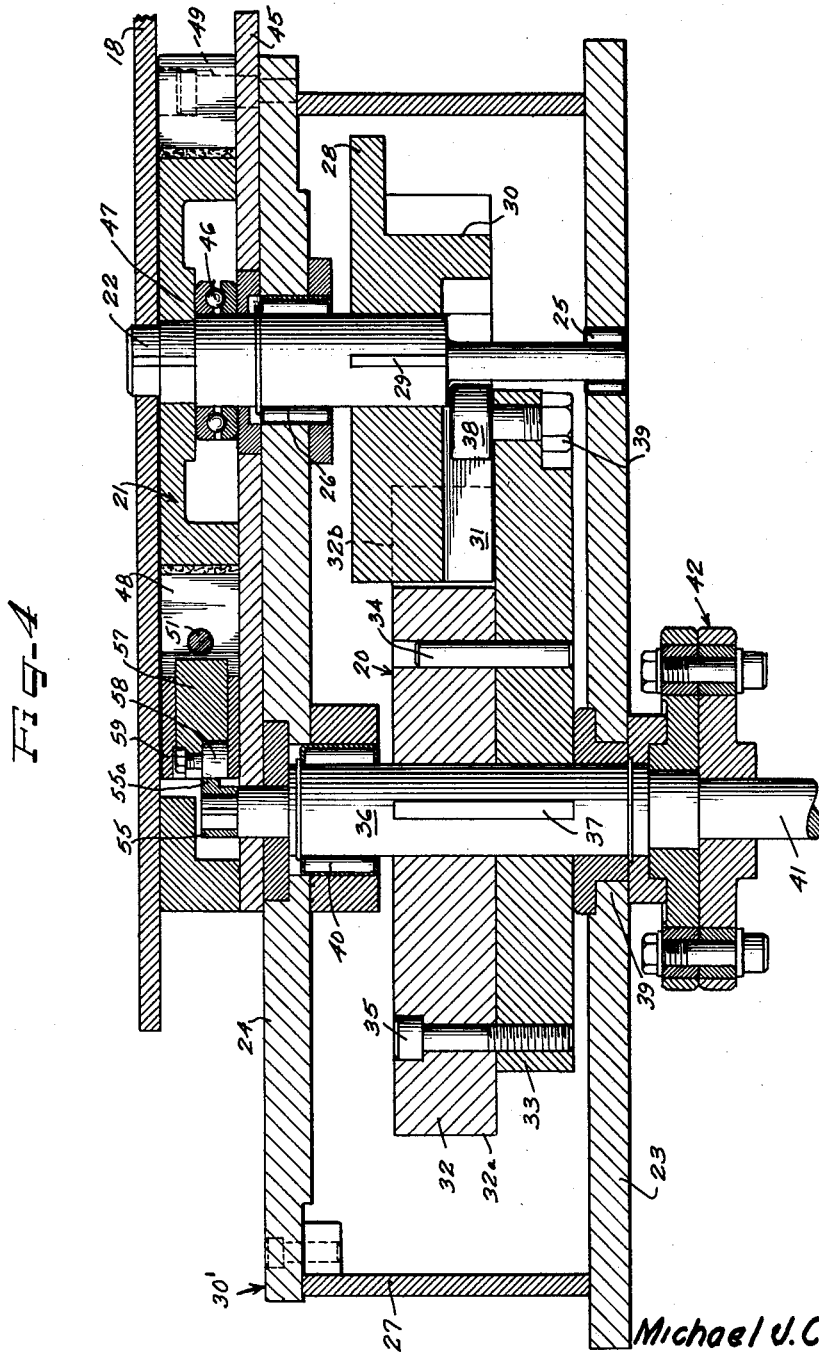
INVENTOR
Michael J. Celovsky
BY
ATTORNEYS United States Patent Office 3,142,942
Patented Aug. 4, 1964

3,142,942
BRAKING DEVICE FOR INDEXING MACHINE
Michael J. Celovsky, Detroit, Mich., assignor to Industrial Tool Engineering Company, Detroit, Mich., a corporation of Michigan
Filed June 9, 1960, Ser. No. 35,009
8 Claims. (Cl. 51—134)

The present invention relates generally to a braking device and more particularly to a braking device for an indexing apparatus. The indexing apparatus may be used with any suitable machine such as a polisher, or abrading or buffing machine adapted to abrade or polish automobile wheel covers, as illustrated. The indexing apparatus and the braking device could be used with a drilling machine, as a further example.

In the past considerable difficulty has been encountered with an indexing drive generally known as a Geneva type indexing drive. The difficulty is that the torque developed in the operation of the indexing drive is substantial and the components of the indexing drive including the shaft and the bearings are subjected to a substantial amount of breakage and wear.

According to the present invention, a braking device has been developed for use with an indexing drive of this type so that breakage and wear on the components of the indexing drive may be substantially reduced. The braking device is coordinated with the starting and stopping of the indexing drive and it functions to permit a smooth pickup and release of the table or object to be indexed and it substantially eliminates abrupt pickup and releases of the table or object to be indexed.

An important object of the present invention is to provide a braking device of an indexing machine which is adapted to reduce wear and breakage of the components of the indexing drive and to increase the useful life thereof.

Still another object of the present invention is to provide a new and improved buffing or polishing machine which is less subject to mechanical failure.

According to the features of the present invention, there is provided brake means for braking a series of abrading stations mounted on a turntable to prevent abrupt starts and stops as the stations are being indexed. The brake means includes a brake drum mounted on a shaft and spring actuated lined brake shoes pivotally mounted about said drum for braking engagement therewith. The brake means further includes a wedge for progressive engagement and disengagement with the shoes and a brake cam is mounted on a drive shaft for actuating the wedge to cause relative movement between the shoes to effect braking. The wedge has a wedge roller to permit the cam to more readily actuate the wedge with a minimum of wear on the parts.

Yet another feature of the present invention relates to an indexing apparatus having the above described braking device coordinated therewith so that the brake cam rotates at the same rate as the turntable.

Other objects and features of the present invention will more fully become apparent in view of the following detailed description taken in conjunction with the accompanying drawings, in which:

FIGURE 1 is a side elevation of an abrading apparatus or machine;

FIGURE 2 is an enlarged fragmentary top elevation of an indexing turntable as viewed substantially on the line II—II, looking in the direction indicated by the arrows as seen in FIGURE 1;

FIGURE 3 is an enlarged fragmentary cross-sectional view taken substantially on the line III—III, looking in the direction indicated by the arrows, as seen in FIGURE 1; and FIGURE 4 is an enlarged fragmentary cross-sectional view taken substantially on the line IV—IV looking in the direction indicated by the arrows, as seen in FIGURE 3.

The reference numeral 10 in FIGURE 1 indicates generally an abrading machine. The abrading machine is comprised of a base 11, a stand 12 and an abrading head assembly 13. It will be noted the abrading head assembly 13 is vertically movable on a rack 14.

The abrading head assembly 13 includes a buffing wheel 15 which is carried on a drive shaft 16 and which is driven by a motor 17. As far as the present invention is concerned, the apparatus 10 could comprise a drilling machine, a grinding machine, a tapping machine, and the like.

Carried on the base 11 is a circular indexing turntable 18. Circumferentially spaced stations 19 are fixedly mounted on the turntable 18. These stations or workpiece supports, as illustrated, are particularly adapted to receive automobile wheel covers and the buffing wheel 15 is adapted to polish covers carried on the stations 19.

Also carried on the base 11 is an indexing mechanism indicated generally at 20. The indexing mechanism 20 is more or less conventional and it comprises what is commonly known as a Geneva type of indexing device.

According to the features of the present invention a braking device indicated generally at 21 has been developed for improving the operation of the indexing mechanism 20. The invention resides in the braking device and the manner in which the braking device 21 is coordinated with the indexing mechanism 20.

A vertical shaft 22 is suitably secured to the turntable 18 at its upper end. In order to support the shaft 22 on the apparatus 10, the base 11 is provided with a base plate 23 and a cover plate 24. A pair of needle bearings 25 and 26 serve to support the shaft 22 on the base plate 23 and the cover plate 24. The base plate 23 and the cover plate 24 are maintained in vertically spaced relation by means of a vertical base or housing wall 27.

The indexing mechanism 20 includes an indexing cam or Geneva gear 28 which is attached by means of a key 29 to the shaft 22. It will be noted the indexing mechanism 20 is disposed within the confines of the plates 23, 24 and the housing wall 27 and these members together define a gear box 30' disposed at one side of the base 11.

The indexing cam 28 has a series of arcuate areas 30 with a common radius disposed about the periphery thereof. The indexing cam 28 further has a series of circumferentially spaced radially extending roll passageway areas 31 which function to separate the arcute areas 30 from one another.

Disposed to one side of the shaft 22 and the indexing cam 28 is a circular plate 32 and a cam roll plate 33 which are secured to one another by means of a dowel 34 and a head screw 35 (FIGURE 4). The plate 32 and 33 are mounted on a drive shaft 36 by means of a key 37.

The circular plate 32 has a circular peripheral surface 32a which has a radius which is the same as the radius of each of the arcuate areas 30 so that when the indexing cam will not rotate relative to the circular plate 32 unless the turntable 18 is being indexed. The circular plate 32 has a circular plate recessed area 32b which is disposed in coaxial relation with respect to one of the passageway areas 31 when the turntable 18 is being indexed. The recessed area 32b is disposed about the juncture of the arcuate surfaces 30, 30 with the recessed passageway 31 when the turntable 18 is being indexed (FIGURE 3).

A cam roll 38 is attached by means of a hex nut 39 to the cam roll plate 33 and this cam roll 38 is engageable within the roll passageway area 31 as the turntable 18 is being indexed. When the circular plate peripheral surface 32a confronts and engages with the arcuate surface 30 on the indexing cam 28, the cam roll 38 is disengaged from the passageway 31 on the indexing cam. Thus, as the plates 32 and 33 turn a single revolution, the cam roll 38 will engage in the indexing cam roll passageway area 31 to cause the turntable to be indexed to bring a different station 19 into underlying relation with respect to the work head or buffing wheel 15. When the cover plate 32 and 33 are rotated a second and a third time (120 degrees), the cam roll engages within the other passageway areas 31 to cause the turntable 18 to be indexed a second and third time (120 degrees).

In view of the foregoing it will be appreciated any suitable number of stations 19 may be provided on the turntable 18 and that the number of arcuate areas 30 and the number of passageway areas 31 must correspond to the number of stations. As illustrated, the turntable 18 is provided with three stations 19 which are adapted to receive wheel covers that require polishing.

As illustrated in FIGURE 4, the plates 32 and 33 are supported on the base plate 23 by means of a bushing 39 and the drive shaft 36 is supported on the cover plate 24 by means of the needle bearing 40. The drive shaft 36 is adapted to be secured to a motor shaft 41 by means of a suitable coupling as indicated at 42 in FIGURE 4. This motor shaft 41 is in turn connected to a speed reducer 43 and to a motor 44. In view of the foregoing it will now be appreciated that as the shaft 36 is rotated, the plates 32 and 33 function to cause the shaft 22 to be actuated or periodically indexed by reason by the coaction between the cam roll 38 and the indexing cam 28.

Supported upon the cover plate 24 is a brake support 45. Thrust bearings 46 function to permit the turntable 18 and a brake drum 47 to be carried in rotatable relation with respect to the support 45. The brake drum 47 is fixedly attached to the shaft 22. Disposed about the perimeter of the brake drum 47 are a pair of brake shoes 48, 48. The brake shoes 48, 48 are secured in pivotal assembly with the support plate 45 by means of pivot pins 49, 49. The pins 49, 49 extend through confronting ends of the shoes 48, 48. It will be noted the shoes 48 have a brake lining 50 carried thereon for engagement with the perimeter of the brake drum 47.

The opposite ends of the brake shoes 48, 48 are secured together by means of a screw 51, a pair of springs 52, 52, and a nut 53. The screw 51 extends transversely of the ends of the shoes 48 at right angles to the pivot pins 49. These springs function to cause the brake lining 50 to be engaged with the peripheral surface of the brake drum 47 at all times except when the spring actuated ends of the brake shoes are caused to be spread apart.

According to other features of the present invention, brake shoe separating means 54 is provided for causing the spring actuated ends of the shoes 48 to be separated so that the turntable 18 may be indexed as the cam roll 38 is engaged within the passageway area 31. To attain this end, the means 54 includes a brake cam 55 which is attached by means of splines 56 to an upper end of the drive shaft 36 disposed at right angles to the cam 55 is a wedge plate 57 which has a wedge shaped end 57a for causing progressive separation of the spring actuated ends of the brake shoes 48 so that when the cam roll is engaged in the recessed area the indexing will not start abruptly nor end abruptly thus reducing the wear on the indexing mechanism.

In order to minimize the wear between the cam 55a and the wedge plate 57, the wedge plate 57 is provided with a roller 58 to permit the wedge plate 57 to be actuated in a smooth way. After the cam 55a has disengaged from the wedge roller 58, the force of the springs 52 will cause the spring actuated ends of the brake shoes 48 to be brought together and this will result in the wedge plate 57 being moved radially with respect to the shoes 48 so that the wedge plate no longer maintains the shoes out of engagement with the brake drum 47.

In order to guide the wedge plate 57 in its radial movement with respect to the brake shoes 48, a wedge plate cover plate 59 is secured by means of a series of pins and screws 60 to the support plate 45.

It will be understood that modifications and variations may be effected without departing from the scope of the novel concepts of the present invention.

I claim as my invention:

1. An indexing apparatus comprising an indexing turntable having a series of stations to be indexed, a shaft connected to said turntable, an indexing cam connected to said shaft for indexing said turntable, said indexing cam having a series of arcuate areas with a common radius and with the arcuate areas being peripherally disposed about said cam, the indexing cam having a series of circumferentially spaced radially extending roll passageway areas separating the arcuate areas from one another, a circular plate having a recessed area in which said cam roll passageway areas are disposable during the course of the rotation of the indexing cam and the circular plate, the circular plate having a peripheral surface having the same radius as the radius of the arcuate areas for periodic engagement together, a drive shaft connected to said circular plate, a cam roll connected to said drive shaft and disposed in coaxial alignment with the recessed area on said circular plate which cam roll is engageable in said cam roll passageway areas at intervals during the course of the rotation thereof for indexing the cam and the turntable, and brake means coordinated with the rotation of said shafts for braking said shaft during the periods of engagement between the peripheral surface of said circular plate and the arcuate areas of said indexing cam, the brake means being progressively releasable as said cam roll enters each of said cam roll passageways on said indexing cam for indexing the turntable and being progresively engageable as said cam roll leaves each of said cam roll passageways after the turntable has been substantially indexed to minimize abrupt starts and stops.

2. An indexing apparatus comprising an indexing turntable having a series of stations to be indexed, a shaft connected to said turntable, an indexing cam connected to said shaft for indexing said turntable, said indexing cam having a series of arcuate areas with a common radius and with the arcuate areas being peripherally disposed about said indexing cam, the indexing cam having a series of circumferentially spaced radially extending roll passageway areas separating the arcuate areas from one another, a circular plate having a recessed area in which said cam roll passageway areas are disposable during the course of the rotation of the indexing cam and the circular plate, the circular plate having a peripheral surface having the same radius as the radius of the arcuate areas for periodic engagement together, a drive shaft connected to said circular plate, a cam roll connected to said drive shaft and disposed in coaxial alignment with the recessed area on said circular plate which cam roll is engageable in said cam roll passageway areas at intervals during the course of the rotation thereof for indexing the cam and the turntable, and brake means coordinated with the rotation of said shafts for braking said shaft during the periods of engagement between the peripheral surface of said circular plate and the arcuate areas of said indexing cam, said brake means including a brake drum mounted on said shaft, said brake means having spring actuated lined brake shoes pivotally mounted about said brake drum for braking engagement therewith, said brake means having a wedge for progressive engagement and disengagement with said shoes, said brake means further having a brake cam mounted on said drive shaft for actuating said wedge to cause relative movement between the shoes to effect braking, the brake cam being coaxially aligned with said cam roll and engaged with said wedge for spreading the shoes when said cam roll is periodically engaged in each of said cam roll recessed areas, the brake means being progressively releasable as said cam roll enters each of said cam roll passageways on said indexing cam for indexing the turntable and being progressively engageable as said cam roll leaves each of said cam roll passageways after the turntable has been substantially indexed to minimize abrupt starts and stops.

3. An abrading machine having an abrading wheel and an indexing turntable having a series of stations for carrying articles to be abraded, a shaft connected to said turntable, an indexing cam connected to said shaft for indexing said turntable, said indexing cam having a series of arcuate areas with a common radius and with the arcuate areas being peripherally disposed about said indexing cam, the indexing cam having a series of circumferentially spaced radially extending roll passageway areas separating the arcuate areas from one another, a circular plate having a recessed area in which said cam roll passageway areas are disposable during the course of the rotation of the indexing cam and the circular plate, the circular plate having a peripheral surface having the same radius as the radius of the arcuate areas for periodic engagement together to prevent rotation of the turntable while the abrading wheel functions to abrade an article carried by said station, a drive shaft connected to said circular plate, a cam roll connected to said drive shaft and disposed in coaxial alignment with the recessed area on said circular plate which cam roll is engageable in said cam roll passageway areas at intervals during the course of the rotation thereof for indexing the cam and the turntable, and brake means coordinated with the rotation of said shafts for braking said shaft during the periods of engagement between the peripheral surface of said circular plate and the arcuate areas of said indexing cam, the brake means being progressively releasable as said cam roll enters each of said cam roll passageways on said indexing cam for indexing the turntable and being progressively engageable as said cam roll leaves each of said cam roll passageways after the turntable has been substantially indexed to minimize abrupts starts and stops.

4. An abrading machine having an abrading wheel and an indexing turntable having a series of stations for carrying articles to be abraded, a shaft connected to said turntable, an indexing cam connected to said shaft for indexing said turntable, said indexing cam having a series of arcuate areas with a common radius and with the arcuate areas being peripherally disposed about said indexing cam, the indexing cam having a series of circumferentially spaced radially extending roll passageway areas separating the arcuate areas from one another, a circular plate having a recessed area in which said cam roll passageway areas are disposable during the course of the rotation of the indexing cam and the circular plate, the circular plate having a peripheral surface having the same radius as the radius of the arcuate areas for periodic engagement together to prevent rotation of the turntable while the abrading wheel functions to abrade an article carried by said station, a drive shaft connected to said circular plate, a cam roll connected to said drive shaft and disposed in coaxial alignment with the recessed area on said circular plate which cam roll is engageable in said cam roll passageway areas at intervals during the course of the rotation thereof for indexing the cam and the turntable, and brake means coordinated with the rotation of said shafts for braking said shaft during the periods of engagement between the peripheral surface of said circular plate and the arcuate areas of said indexing cam, said brake means including a brake drum mounted on said shaft, said brake means having spring actuated lined brake shoes pivotally mounted about said brake drum for braking engagement therewith, said brake means having a wedge for progressive engagement and disengagement with said shoes, said brake means further having a brake cam mounted on said drive shaft for actuating said wedge to cause relative movement between the shoes to effect braking, the brake cam being coaxially aligned with said cam roll and engaged with said wedge for spreading the shoes when said cam roll is periodically engaged in each of said cam roll recessed areas, the brake means being progressively releasable as said cam roll enters each of said cam roll passageways on said indexing cam for indexing the turntable and being progressively engageable as said cam roll leaves each of said cam roll passageways after the turntable has been substantially indexed to minimize abrupt starts and stops.

5. An indexing apparatus comprising an indexing turntable having a series of stations to be indexed, indexing means connected to said turntable for indexing the turntable, and brake means connected to said turntable for braking said turntable as it is being started and stopped to minimize abrupt starts and stops thereby reducing wear on said indexing means, said indexing turntable being mounted on a rotatable shaft, a brake drum carried on said shaft, said brake means including brake shoes engageable with said drum and with said shoes having spreadable ends, a wedge movable between the ends for separating said ends and disengaging said shoes from said brake drum, said brake means including a cam having its movement synchronized with indexing of the turntable by said indexing means and with said cam being engaged with said wedge for actuating the wedge for minimizing abrupt starts and stops of the turntable as the turntable is being indexed.

6. In an abrading machine including an abrading wheel and an indexing turntable having a series of indexable stations for carrying articles to be abraded, indexing means connected to said turntable for indexing the turntable, and brake means connected to said turntable for braking said turntable as it is being started and stopped to minimize abrupt starts and stops thereby reducing wear on said means, said indexing turntable being mounted on a rotatable shaft, a brake drum carried on said shaft, brake shoes engageable with said drum when ends of said shoes are spaced, a wedge movable between the ends for separating said ends and disengaging said shoes from said brake drum, said brake means including a cam having its movement synchronized with indexing of the turntable by said indexing means and with said cam being engaged with said wedge for actuating the wedge for minimizing abrupt starts and stops of the turntable as the turntable is being indexed.

7. The indexing machine of claim 5 further characterized as having spring means for compressing the ends of said shoes for forcing the wedge from between the shoes as the cam is disengaged from the wedge.

8. A machine having an indexing turntable with a series of spaced indexable stations thereon for carrying articles, indexing means connected to said turntable for indexing said stations on said table, brake means securing said table in a fixed position, and means synchronized with the operation of said indexing means in the indexing of said turntable for progressively releasing and applying said brake means to said table as indexing of the turntable is started and stopped to minimize abrupt starts and stops.

References Cited in the file of this patent
UNITED STATES PATENTS

| | | |
|---|---|---|
| 2,096,134 | Raber et al. | Oct. 19, 1937 |
| 2,329,756 | Granberg et al. | Sept. 21, 1943 |
| 2,821,818 | McGee et al. | Feb. 4, 1958 |
| 2,880,557 | Todd et al. | Apr. 7, 1959 |